April 12, 1966   D. J. FIRST ETAL   3,245,252
TEMPERATURE COMPENSATED SEMICONDUCTOR STRAIN GAGE UNIT
Filed Nov. 15, 1961   2 Sheets-Sheet 1

INVENTORS
DAVID J. FIRST
ANTHONY D. KURTZ
JEAN-PIERRE A. PUGNAIRE
BY Blair & Buckles
ATTORNEYS April 12, 1966   D. J. FIRST ETAL   3,245,252
TEMPERATURE COMPENSATED SEMICONDUCTOR STRAIN GAGE UNIT
Filed Nov. 15, 1961   2 Sheets-Sheet 2

INVENTORS
DAVID J. FIRST
ANTHONY D. KURTZ
JEAN-PIERRE A. PUGNAIRE
BY Blair + Buckles
ATTORNEYS

United States Patent Office 3,245,252
Patented Apr. 12, 1966

3,245,252
TEMPERATURE COMPENSATED SEMICONDUCTOR STRAIN GAGE UNIT
David J. First, Burlington, Mass., Anthony D. Kurtz, Englewood, N.J., and Jean-Pierre A. Pugnaire, Arlington, Mass., assignors to Kulite-Bytrex Corporation, Newton, Mass.
Filed Nov. 15, 1961, Ser. No. 152,383
13 Claims. (Cl. 73—88.5)

The present invention concerns temperature compensating networks for strain gage bridges and the like, and, in particular, it relates to such networks which provide temperature compensation without the use of added temperature sensitive devices.

The invention is specifically directed to the temperature compensation of force- or displacement-measuring devices such as strain gages, load cells and pressure cells, which make use of strain-sensitive bridge circuits. These devices often incorporate transducers having values of electrical resistance which vary with strain. Accordingly, one may measure the strain in a body to which a strain gage of this type is attached by measuring the resistance of the gage. Generally, a bridge circuit is used to compare the voltage across several gages, which are mounted so that when some undergo tension, others are in compression. The output of such a bridge commonly varies with the temperature, and this may not be permissible in some applications where high accuracy is needed.

Typical attempts in the prior art to cope with this problem have usually involved either the provision of further temperature-sensitive elements or calibration of the bridge output against temperature. The addition of temperature sensitive elements has not fully achieved the desired results because of the added expense of the compensating elements, as well as the difficulties involved in achieving close compensation. Calibration against temperature has proven to be impractical because of the time involved in reading and the difficulty of measuring temperature at the gage with sufficient accuracy. An analogous problem occurs with the use of temperature-sensitive compensating elements, since they must experience the same temperatures as the strain-sensitive elements, a condition that is most difficult to achieve in practice.

Recently there have come into widespread use semiconductive gages of the above character, which provide a greatly increased sensitivity to strain, of the order of a hundred times greater than the previous metallic type strain gages. This has largely increased the temperature problems formerly experienced in the art, since typical values of the temperature coefficient of resistance of a semiconductive strain gage are in the neighborhood of 30% per hundred degrees Fahrenheit. Furthermore, semiconductive gages may have a temperature coefficient of gage factor of approximately minus 18% per hundred degrees Fahrenheit. Also the values of these coefficients often vary significantly from gage to gage.

It is accordingly an object of the present invention to provide an improved temperature compensated bridge type transducer.

It is a further object of the invention to provide a temperature compensated bridge of the above type in which the effects of temperature caused by differences in the characteristics of individual bridge elements are substantially reduced.

It is a further object of the invention to provide a temperature compensated bridge of the above character which compensates for changes in both gage element impedance and gage element sensitivity.

Another object of the invention is to provide a temperature compensated bridge of the above character which is easily calibrated, and which is simple and inexpensive.

Yet another object is to provide a temperature compensated transducer of the above character which has greatly improved linearity of response to the measured condition.

Other objects of the invention will in part be obvious and will in part appear hereinafter.

The invention accordingly comprises the features of construction, combinations of elements and arrangement of parts which will be exemplified in the construction hereinafter set forth, and the scope of the invention will be indicated in the claims.

For a fuller understanding of the nature and objects of the invention, reference should be had to the following detailed description, taken in connection with the accompanying drawings, in which.

Similar reference characters refer to similar parts throughout the several views of the drawings.

Figure 1:
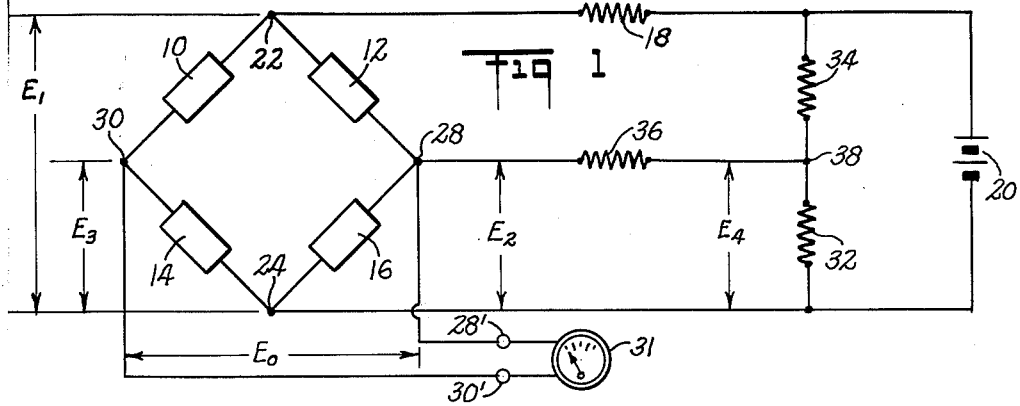
FIG. 1 is a schematic diagram of a four-element strain gage bridge circuit incorporating our invention.

In the following discussion, the various circuit parameters are identified by standard symbols with subscripts indicating the components associated with them. Thus $R_{18}$ is the resistance of the component identified by the reference numeral 18.

Referring now to FIG. 1 of the drawings, there is shown a Wheatstone bridge comprising four strain-sensitive resistance elements 10, 12, 14 and 16. The bridge is powered by a power supply 20 connected in series with a resistor 18 across one diagonal of the bridge (junctions 22 and 24), and the output signal is being taken across the other diagonal at junctions 28 and 30. When the bridge is used to monitor strain in a load cell, the elements 10–16 are generally arranged so that the strain causes compression in one opposite pair of elements and tension in the other pair. While the power supply is indicated as a battery, obviously it may consist of any suitable source of alternating or direct current. Similarly, while the disclosure refers specifically to strain gages, other condition-sensitive transducers may equally well be compensated in accordance with the invention.

The output voltage, $E_0$, of the bridge, as registered by a suitable voltmeter 31 connected to terminals 28' and 30', may be represented by, $$E_0 = E_1 S G_f \times \frac{4}{4} \qquad (1)$$

where,
  $E_1$ is the voltage supplied to the bridge across junctions 22 and 24,
  S is the strain applied to each active bridge element, and
  $G_f$ is the gage factor of one of the elements, i.e., the resistance change per unit of applied strain.

There is a 4 in the numerator because of the four active strain elements, and the 4 in the denominator is a constant of the equation.

Variations of temperature have several effects on the above equation. Since highly doped semiconductor material used in strain gages has a substantial positive temperature coefficient of resistance, voltage $E_1$ increases with increasing temperature, and this tends to increase the bridge output for a given strain. Conversely, the gage factor has a negative temperature coefficient, and this tends to lower the bridge output as the temperature increases. Furthermore, there are variations in each of these factors from element to element.

The circuit shown in FIG. 1 utilizes the temperature coefficient of resistance of the strain gages to compensate for the change in gage factor and further provides compensation for dissimilarities among the individual gages.

More specifically, assume that the elements 10–16 have substantially the same resistance, $R_g$. Also assume that resistor 36 has an infinite value and that the temperature coefficients of resistance of the four strain elements are exactly equal so that the bridge remains balanced as temperature increases. The temperatures of all four elements increase equally and thus the bridge resistance measured from 22 to 24 increases with temperature. Moreover, this bridge resistance is equal to $R_g$, and therefore, $$E_1 = \frac{E_{20} R_g}{R_g + R_{18}} \quad (2)$$

It is seen that if $R_{18}$ is large relative to $R_g$, $E_1$ is substantially proportional to $R_g$. Thus, as the temperature of the strain gage increases, the resistance $R_g$ increases and therefore $E_1$ also increases.

In Equation 1 above, the bridge signal output is shown to be proportional to both $E_1$ and the gage factor. Also, as noted above, the gage factor decreases with temperature (a characteristic of semiconductor gages). Thus, if resistor 18 is very large and the magnitude of temperature coefficient of resistance were exactly equal to that of the temperature coefficient of gage factor, the bridge signal output for a given strain would remain constant with temperature.

However, since the temperature coefficient of resistance is greater than the temperature sensitivity of gage factor (as is the case with present strain gages), the bridge signal output will tend to increase with temperature in the circuit described above. This can be overcome by reducing the resistance of resistor 18 until the effect of an increasing $R_g$ on $E_1$ is cancelled by the decrease in gage factor with temperature. This follows from Equation 2, above, which shows that a reduction in the resistance $R_{18}$ to a value nearer $R_g$ lowers the rate of increase of $E_1$ with increasing temperature. A particular value for resistor 18 can be found for which the voltage $E_1$ increases with temperature at the proper rate to substantially offset the decrease in sensitivity to applied strain caused by the negative temperature coefficient of gage factor.

Assuming that the temperature coefficients of resistance of all four strain elements 10–16 are exactly equal, the bridge circuit may be adjusted or compensated for temperature variations by placing a standard load on the strain gage at a reference temperature, increasing the temperature to a substantially higher (or lower) level and adjusting the value $R_{18}$ so that the bridge output reading under the standard load is the same as the reading at the initial reference temperature. However, this changes the calibration at the reference temperature, since the voltage $E_1$ will now be different at this temperature because of the changed value of $R_{18}$.

Accordingly, the gage is then returned to the reference temperature, and the bridge output noted with the same standard load. Next, the temperature is again raised to the higher level, and resistor 18 is adjusted so as to duplicate the last reading obtained at the lower temperature. The steps are repeated, each cycle yielding a value of $R_{18}$ closer to the value required for adequate compensation.

In practical cases, the temperature coefficients of all four strain elements are not exactly equal. Thus, a spurious bridge output signal occurs as the temperature changes. This output signal is present when the applied load is zero, as well as when the elements 10–16 are under strain. A compensating network comprising resistors 32, 34 and 36 makes use of this fact in providing for adjustment which is essentially independent of the value of $R_{18}$ over its range of variation. This compensation may be termed "zero load compensation" as opposed to the "calibration drift compensation" accomplished with the resistor 18.

More specifically, resistors 32 and 34 form a voltage divider across the power supply 20, their respective values being chosen so that voltage $E_4$ is equal to the voltages $E_2$ and $E_3$ at the reference temperature. $E_2$ and $E_3$ may be equalized by control of fabrication of the elements 10–16, selection of the elements or insertion of a resistor (not shown) in one of the arms of the bridge.

Under this condition, resistor 36 may be inserted at the reference temperature without affecting initial balance conditions, since no current will flow through it. In particular, resistor 36 is connected between the junction 38 and the junction 28 or 30, whose voltage ($E_2$ or $E_3$) otherwise undergoes the greater change with temperature. In the illustrated case, this is the junction 28. As the temperature of the bridge is increased, the voltages at $E_2$ and $E_3$ tend to increase while the voltage $E_4$ tends to remain constant. The resulting voltage drop across the resistor 36 corresponds to a current through this resistor. The resulting load imposed at the junction 28 reduces the voltage $E_3$ below its value in the absence of the resistor 36. A particular value of $R_{36}$ can be found which will constrain the voltage changes at the junction 28 (due to temperature changes) to be substantially equal to the voltage changes at junction 30. Thus, if the resistor 36 is adjusted so that $E_2 = E_3$ at the elevated temperature, these voltages will also be substantially equal at intermediate temperatures, as well as at temperatures below the reference temperature.

Ordinarily, resistor 18 is first adjusted in the above manner, with both no-load and loaded readings being taken at the elevated temperature in order to offset the zero shift caused by temperature. Then $R_{36}$ is varied to obtain the correct value thereof. This may upset the bridge calibration somewhat, requiring readjustment of $R_{18}$.

The above circuit is fully practical whenever the differences in temperature coefficients of resistance of the four elements are much smaller than the nominal temperature coefficient itself. The value of the resistance $R_{36}$ is then large relative to the bridge resistance $R_g$, and consequently the loading effect of the resistor 36 on the bridge output, a factor tending to reduce sensitivity, is kept small.

While FIG. 1 shows four strain elements arranged in a bridge circuit, the two elements at the right (12 and 16) may be replaced by a pair of dummy resistors without changing either the temperature compensation circuitry or the procedures for adjusting it.

Figure 2:
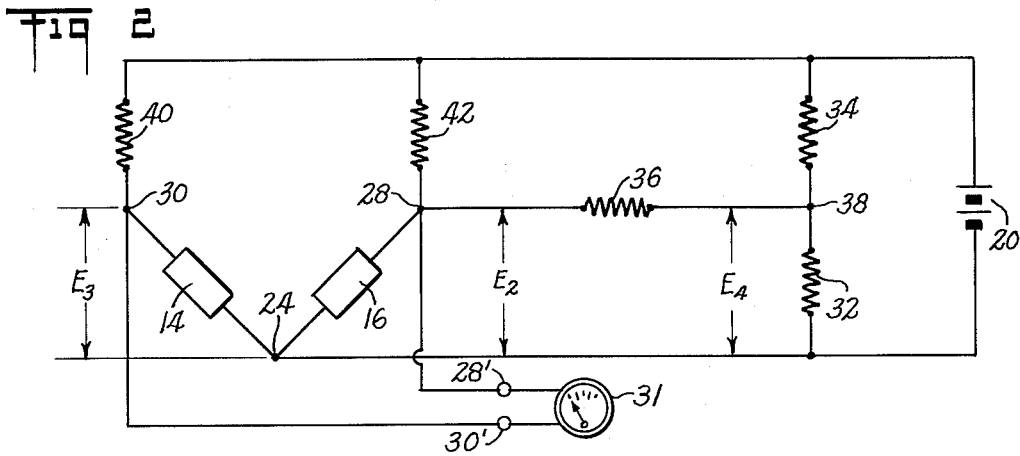
FIG. 2 is a schematic diagram of a modification of the circuit of FIG. 1, utilizing two strain elements instead of four.

The circuit of FIG. 2 is similar to that of FIG. 1, except that it utilizes only the two lower strain elements 14 and 16. The upper pair of strain elements (10 and 12) and resistor 18, have been replaced by a pair of resistors 40 and 42. The resistors 40 and 42 are both adjusted in the manner described above so that they jointly accomplish the function of the resistor 18 of FIG. 1. Resistors 32, 34 and 36 perform substantially the same functions in FIG. 2 as in FIG. 1, and are similarly selected and adjusted.

As noted above, the embodiments of FIGS. 1 and 2 may require several cycles of raising and lowering the temperature, and adjusting the resistor 18 (FIG. 1) and resistors 40 and 42 (FIG. 2), in order to arrive at the correct resistance values. The embodiment shown in FIG. 3 provides for temperature compensation without shifting of the bridge calibration, and, thus, usually only one cycle of temperature change is necessary in order to compensate the circuit.

Figure 3:
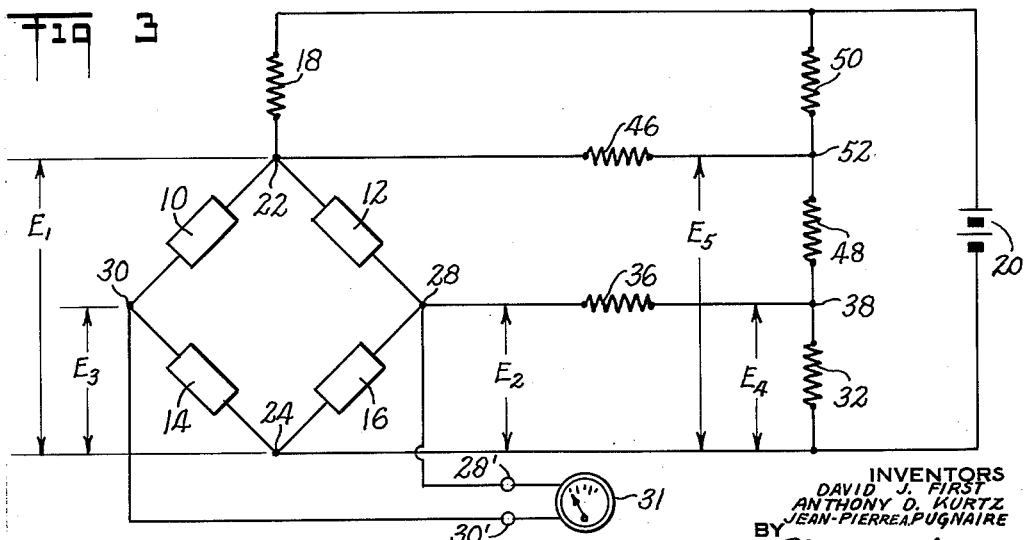
FIG. 3 is a circuit schematic diagram of a further modification of our basic circuit providing improved temperature characteristics and greater simplicity of adjustment.

As is apparent from a comparison of FIG. 3 with FIG. 1, FIG. 3 differs by the inclusion of a resistor 46, connected between junction 22 and what corresponds to a tap on resistor 34 (FIG. 1). In FIG. 3, the tapped resistor 34 has been replaced by a pair of resistors 48 and 50 connected to the resistor 46 at a junction 52. Resistor 18 is chosen so as to over-compensate for the temperature coefficient of gage factor, i.e., resistance $R_{18}$ is too large for perfect compensation. Resistors 32, 48 and 50 are then chosen so that the voltages $E_2$, $E_3$ and $E_4$ are equal to each other, and voltage $E_5$ equals voltage $E_1$ under the no-load reference temperature condition. Accordingly, resistors 36 and 46 may be added without disturbing the bridge balance under this condition. Assuming that the resistances $R_{10}$–$R_{16}$ are equal at the reference temperature, resistor 48 will be identical in resistance value to the resistor 32.

The procedure for adjusting the FIG. 3 circuit is quite simple. First the bridge output is noted at the reference temperature with a standard load. The temperature is then raised, and the bridge output with no load is noted. The standard load is re-applied, and the resistor 46 is adjusted to make the bridge output equal to the sum of the standard load output at the reference temperature and the zero load output at the elevated temperature. The load is then removed, and resistor 36 is adjusted to give a zero output signal at the elevated temperature. Adjustment of resistor 36 changes the calibration of the bridge somewhat, because of the change in electrical loads imposed on both the bridge and the voltage divider 32–48–50. If this effect is significant in the intended application of the circuit, the compensation cycle should be repeated; this will provide essentially exact compensation.

The zero load compensation also takes care of the temperature expansion of the body to which the gage is affixed. That is, each gage is compensated for use with a specific metal or other material. During calibration, the gage is attached to the particular material, and when the temperature is raised, each of the strain elements is placed in tension, due to the apparent omnidirectional strain in the gaged object. If the elements were all the same, this would not cause an unbalance in the bridge. However, their strain sensitivities may very well be different. This gives rise to an unbalance voltage in the bridge output. However, adjustment of the zero balance resistor 36 compensates for this in the same manner that it compensates for variations in the change in resistance.

The variation in loading caused by adjustment of the resistor 36 can be reduced considerably by connecting another resistor 36' (not shown) between the junctions 30 and 38. Then, in order to balance the bridge under no-load conditions at elevated temperatures, $R_{36}$ may be decreased and $R_{36}'$ increased or vice versa, so that the total loads imposed on the bridge and voltage divider do not change. A drawback to this expedient is that the total load on the bridge is considerably greater than with the single resistor 36, and, therefore, the bridge sensitivity is reduced. The effect of loading on the resistive voltage divider can also be alleviated by providing two dividers, one for the resistor 36 and one for the resistor 46. This requires one extra resistor.

In a typical case, the values of the various resistors in the circuit of FIG. 3 might be as follows:

$R_g$=1000 ohms (nominal). (Thus, the impedance of the bridge is 1000 ohms.)
$R_{32}$=500 ohms
$R_{48}$=500 ohms
$R_{18}$=1500 ohms
$R_{50}$=1500 ohms. (Selected if $R_g \neq$1000 ohms.)
$R_{36}$=100,000 ohms
$R_{46}$=10,000 ohms The series resistor 18 also improves the linearity of the bridge. The resistance versus strain characteristics of the semiconductor elements are not exactly linear. Also, the gages are generally mounted so that, for each element that is put in tension, another is placed in compression, and the slope of the strain characteristic is different for compression in this region than for tension. More specifically, the compression sensitivity is less than the tension sensitivity for small strains, and this tends to reduce the composite bridge sensitivity below the value thereof for larger strains. At the same time, however, the difference between compression and tension sensitivities results in an increase in total bridge resistance as strain increases. This increases the voltage $E_1$ across the bridge and thus tends to increase sensitivity and linearize the output voltage versus strain characteristic.

In the embodiments described above, the zero load compensation changes non-linearly with temperature. This occurs because the compensation is generated by two sources. First, the bridge resistance, and thus the bridge voltage $E_1$, increases with temperature. The compensation current through resistor 36 is proportional to $E_1$. At the same time, since the strain element resistance is increasing, the voltage drop per unit of compensation current also increases. The compensation, which is due to the loading effect of the compensation current in producing a voltage drop across the affected strain elements, is thus doubly affected. Thus, it is a second order, or non-linear, function of temperature.

In most cases, it is desirable to have a non-linear zero-load compensation, since the uncompensated zero-load output is also usually a non-linear function of temperature. Also, since the bridge series dropping resistor 18 is finite in value, the bridge voltage $E_1$ does not change proportionally with the gage resistance change. Thus, the circuit of FIG. 3 provides a fairly good degree of correspondence between the zero-load compensation and the uncompensated zero-load output. In fact, a strain gage transducer using this circuit has been found to have a total temperature-caused error of less than one percent over the range of $-50°$ F. to $+200°$ F. However, in some cases even closer correspondence may be desired, and this is provided by the circuit of FIG. 4.

Figure 4:
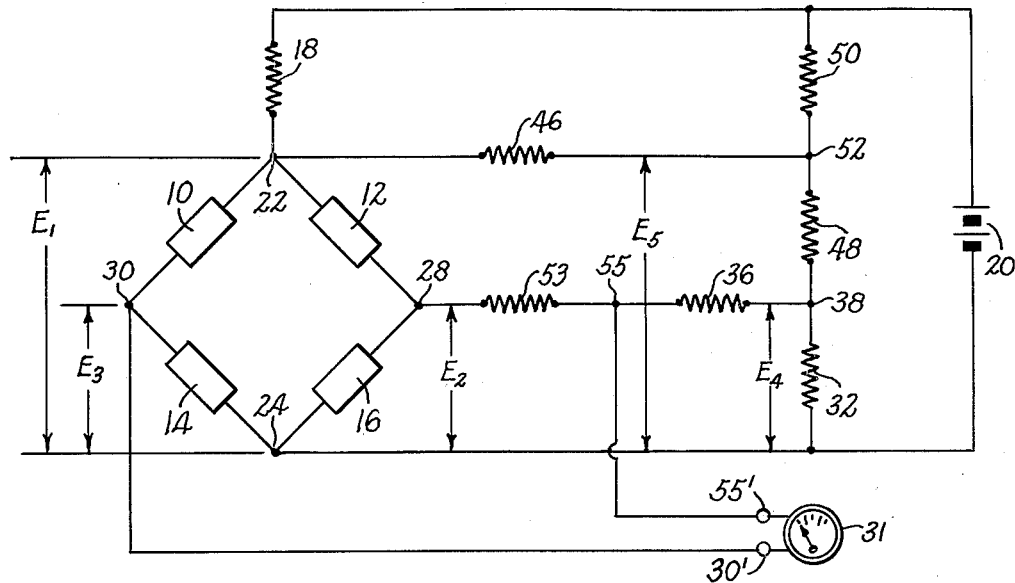
FIG. 4 is a schematic diagram of a further modification of our basic circuit providing means for adjusting the nonlinearity of the temperature compensation.

More specifically, in FIG. 4, a resistor 53 has been connected in series with the resistor 36. The junction 55 now replaces the junction 28 as an output connection. To understand operation of the circuit, consider first the case where $R_{53}$=0; the circuit is then the same as in FIG. 3. On the other hand, when the resistance $R_{53}$ is very large, it blankets the strain element resistance $R_g$ so that the zero-load compensation is a function only of the current through the compensating resistor 36, and the correction is thus proportional only to the voltage $E_1$. Thus, the linearity of the zero-load compensation can be adjusted by varying $R_{53}$. By properly adjusting this resistance, the zero-load compensation can be made to conform closely to the characteristic of the uncompensated zero-load output voltage of the transducer. Both $R_{36}$ and $R_{53}$ in FIG. 4 are adjusted, the adjustments being such as to essentially eliminate zero-load output at an elevated (or depressed) temperature and also at points between this temperature and the reference temperature.

In some cases it is desirable that the zero-load compensation be proportional to strain element resistance. This is accomplished by the circuit of FIG. 5. In this circuit, gage elements 10 and 14 are arranged in a half bridge, the bridge being completed by dummy resistors 56 and 58. The voltage supplied to the bridge at terminals 22 and 24 is constant in the absence of resistor 18 of FIG. 1. As before, the junction 38 between resistors 32 and 34 is connected by resistor 36 to the junction 28. Junction 38 is further connected by a resistor 60 to the junction 30. Preferably, resistors 56 and 58 have resistances related by $$\frac{R_{58}}{R_{36}} = \frac{Rg}{R_{60}}$$

In the case where $R_{58}=R_g=R_{56}$, $R_{36}=R_{60}$, and $R_{34}=R_{32}$. Then the voltages $E_2$, $E_3$ and $E_4$ are identical, and no current flows in resistors 36 and 60. If the resistance $R_{34}$ is then decreased, equal currents will flow in resistors 36 and 60, and, in the absence of an applied load, there will be no resulting bridge output signal between terminals 28 and 30. When the temperature increases, $R_g$ increases. $R_{36}$ and $R_{60}$ are much greater than $R_g$, and therefore the current through the resistor 60 is essentially unchanged. Therefore, the voltage $E_3$ is increased relative to the voltage $E_2$. This increase can be made to offset zero-load temperature-caused unbalance, resulting from differences between elements 10 and 14, by adjusting the $R_{32}$, $R_{34}$ or $R_{36}$ and $R_{60}$. If the unbalance is in the opposite direction, $R_{34}$ can be made larger than $R_{32}$.

Figure 5:
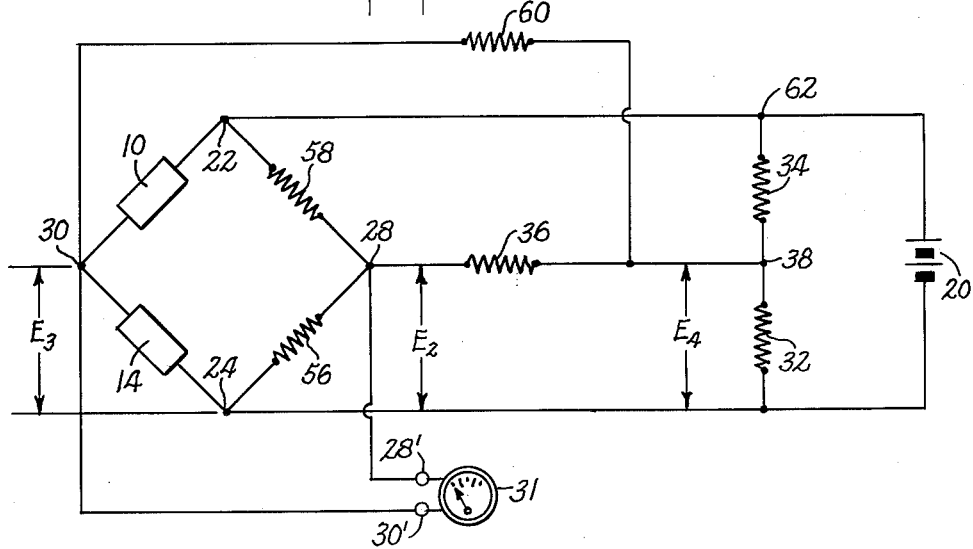
FIG. 5 is a schematic diagram of another embodiment of our invention.

The circuit of FIG. 5 may be combined with the temperature compensation resistor 18 as in FIG. 1 described above, in which case the resistor 18 is connected between the battery 20 and point 62 in FIG. 5. With this connection, the voltage at the point 22 will always equal the voltage at the point 62 so as to maintain linearity of zero load compensation.

Moreover, under some conditions of temperature and semiconductor crystal doping, it is possible for the resistance and gage factor to change in the same direction as a function of temperature. For example, they may both increase with increasing temperature. Calibration compensation can then be accomplished by the circuit of FIG. 5 (without the resistor 18). For example, assume that resistance and gage factor are both increasing. The combined value of $R_{60}$ and $R_{36}$ can then be reduced to the point where they load down the bridge and thus decrease output voltage as bridge resistance increases, by an amount sufficient to offset the increase in output voltage resulting from increased gage factor. This loading function may, of course, be supplied by a lowered impedance in the output device represented by the meter 31, this impedance having been assumed, in the discussions above, to be very large compared to the source impedance of the bridge circuit.

While the novel circuitry has been described with particular reference to semiconductor strain gages, it is not limited to these specific elements, but in many cases can be utilized as well with conventional wire or foil strain gages having similar compensation problems. Furthermore, the invention is not limited to strain gages, but is applicable to other types of transducers, such as load cells and pressure cells.

It will thus be seen that the objects set forth above, among those made apparent from the preceding description, are efficiently attained and, since certain changes may be made in the above circuits without departing from the scope of the invention, it is intended that all matter contained in the above description or shown in the accompanying drawings shall be interpreted as illustrative and not in a limiting sense.

We claim:

1. A bridge circuit for measuring a first condition, said circuit comprising, in combination, first, second, third and fourth impedance elements, at least two of said impedance elements having a first variation in impedance in response to said first condition and a second condition and a second variation in the response to said first condition in response to said second condition, said variations having opposite algebraic signs and different magnitudes, a source of potential having first and second terminals; said first and second impedance elements being connected in series between said first terminal and a first junction point, a second junction point between said first and second elements, said third and fourth impedance elements being connected in series between a first terminal and a first junction point and in parallel with said first and second elements, a third junction point between said third and fourth elements; and compensating means for reducing the net effect of said first and second variations substantially to zero, said compensating means comprising an impedance connected between said first junction point and second terminal, the impedance value of said compensating means being unaffected by said second condition whereby the value of said first condition and being such as to substantially equalize the magnitudes of the effects of said variations on the output voltage of said bridge circuit may be detected independently of the value of said second condition.

2. A strain gage bridge circuit comprising first, second, third and fourth semiconductive strain elements, said elements having a positive temperature coefficient of resistance and negative temperature coefficient of gage factor, said positive temperature coefficient being larger than said negative temperature coefficient, a first resistor, said first and second elements and said first resistor being connected in series in the order named between a point of reference potential and a first source of potential, said third and fourth elements being connected in series in the order named between said point of reference potential and the end of said first resistor which is remote from said source of potential, the resistance of said first resistor being unaffected by the temperature of said strain elements and so related to said gage resistances and said temperature coefficients that the increasing voltage developed due to increasing temperature between said remote end of said first resistor and said point of reference potential substantially offsets said negative temperature coefficient of gage factor, whereby the output voltage across said bridge output terminals due to an applied strain is substantially unaffected by temperature.

3. The combination defined in claim 2 including a second source of potential, said bridge circuit being at balance at a reference temperature with a given value of applied strain, at least two arms of said circuit having unequal temperature coefficients of resistance, whereby said bridge is unbalanced with said given strain value for temperatures other than said reference temperature, the potential of said second source being equal to the potential at the junctions between said first and second elements and said third and fourth elements when said circuit is at balance, said second source being connected to the one of said junctions having the greater change of potential with temperature in the absence of the connection of said source, the impedance of said second source being such as to provide substantially equal temperature-induced changes in the potentials of said junctions.

4. The combination defined in claim 3 in which said second source of potential comprises a voltage divider connected between said first source and said reference point and having a third junction, and an impedance element connected between said third junction and said junction of said bridge to which said second source is connected.

5. The combination defined in claim 3 wherein one output terminal of said circuit is at the junction between said first and second elements and a further output terminal is connected to a tap on said impedance of said second source.

6. A bridge circuit comprising, in combination, first and second power supply terminals; a first transducer and a first impedance connected in series in the order named between said first and said second terminals; a second transducer and a second impedance connected in series in the order named between said first and second terminals; bridge output terminals connected to the junctions between said transducers and said impedances; said transducers having impedance values which vary in one sense and sensitivities which vary in the opposite sense with temperature change, said first and second impedances being unaffected by temperature change of said transducers, said first and second impedances being so related to said transducer impedance and sensitivity variations that the changing voltage appearing across said transducers due to temperature changes substantially compensates for said sensitivity changes.

7. The bridge circuit of claim 6, further comprising means to compensate for different responses of the first and second transducers to temperature, said compensating means comprising a source of potential connected to the output terminal whose voltage relative to said first power supply terminal varies most with temperature, the impedance of said source being such as to substantially reduce the difference in voltage variations at said output terminals with temperature.

8. In combination, a condition-sensing bridge circuit having four arms, a first impedance in at least one arm exhibiting a first variation in its value with the temperature of said impedance and being sensitive to said condition, said first impedance exhibiting a second temperature-caused variation in its sensitivity to said condition, said first and second variations being of opposite algebraic sign and of different magnitude, a power supply in series with a second impedance connected across one diagonal of said bridge, the value of said second impedance being unaffected by the temperature of said one arm and being such as to maintain substantially constant the sensitivity of said bridge circuit to said condition over a substantial range of temperatures.

9. The circuit of claim 8 in which a second arm of said bridge contains a second impedance sensitive to said condition and exhibiting variations similar to those of said first impedance.

10. In combination a strain gage bridge circuit having four arms, strain gages in at least two of said arms, each of said strain gages exhibiting a first variation in its resistance with the temperature of the strain gage and a second temperature-caused variation in its sensitivity to strain, said first and second variations being of opposite algebraic sign and of different magnitude, a power supply in series with a first impedance connected across one diagonal of said bridge, the value of said first impedance being unaffected by the temperature of said strain gages and being such as to maintain substantially constant the sensitivity of said bridge circuit to strain over a substantial range of temperatures.

11. In combination, a condition-sensing bridge circuit comprising at least two impedance elements which are sensitive to temperature and to said condition, the sensitivities to temperature being different, whereby a change in the temperature of said elements shifts the balance condition of said bridge circuit, a power supply connected across one diagonal of said bridge circuit, a pair of bridge output terminals at the other diagonal of said bridge circuit, a voltage divider connected across said power supply, a first resistor connected between a point on said voltage divider and one of said bridge output terminals, and a second resistor connected between said point on said voltage divider and the other of said output terminals, the resistances of said first and second resistors being substantially greater than the impedance of said bridge circuit, whereby the currents through said first and second resistors are essentially unaffected by temperature-caused variations in said bridge circuit impedance.

12. The combination defined in claim 11 in which the resistances of said first and second resistors are such that at a reference temperature the voltage drops across them are equal.

13. The combination comprising first, second, third and fourth impedance elements, at least two of said impedance elements being transducers which are responsive to a condition to be measured, said transducers having a positive temperature coefficient of resistance and a negative temperature coefficient of sensitivity to said condition, said positive temperature coefficient being larger than said negative temperature coefficient, a first resistor, said first and second impedance elements and said first resistor being connected in series in the order named between a point of reference potential and a source of potential, said third and fourth impedance elements being connected in series in the order named between said point of reference potential and the end of said first resistor remote from said source of potential, bridge output terminals connected to the respective junctions between said first and second impedance elements and between said third and fourth impedance elements, the resistance of said first resistor being unaffected by the temperature of said transducers and being so related to the impedances of said impedance elements and said temperature coefficients that the change in voltage between said remote end of said first resistor and said point of reference potential due to increasing temperature overcompensates for said negative temperature coefficient of sensitivity; second and third resistors serially connected in the order named between said point of reference potential and said source of potential, a fourth resistor connected between the junction between said second and third resistors and the junction between said third and fourth elements, the resistances of said second and third resistors being such that the voltage across said second resistor is equal to the voltage across said fourth element at a reference temperature, the resistance of said fourth resistor being such as to maintain the temperature-induced voltage changes across said third impedance element equal to the temperature-induced voltage changes across said first impedance element, whereby said bridge output voltage is substantially unaffected by dissimilarities in characteristics among the individual transducers, and a fifth resistor connected between said remote end of said first resistor and a point on said third resistor at which the voltage is equal to the voltage at said remote end of said first resistor at said reference temperature, the resistance of said fifth resistor being such that the voltage developed between said remote end of said first resistor and said point of reference potential substantially compensates for said negative temperature coefficient of sensitivity.

References Cited by the Examiner

UNITED STATES PATENTS

| | | | |
|---|---|---|---|
| 2,658,819 | 11/1953 | Formwalt | 73—88.5 |
| 2,980,852 | 4/1961 | Mell | 73—88.5 |
| 3,034,345 | 5/1962 | Mason | 73—141 |

RICHARD C. QUEISSER, *Primary Examiner.*

DAVID SCHONBERG, *Examiner.*